United States Patent
Ozawa et al.

(10) Patent No.: US 6,814,910 B2
(45) Date of Patent: Nov. 9, 2004

(54) AROMATIC POLYIMIDE FOAM

(75) Inventors: Hideki Ozawa, Chiba (JP); Shigeru Yamamoto, Chiba (JP)

(73) Assignee: Ube Industries, Ltd., Yamaguchi (JP)

( * ) Notice: Subject to any disclaimer, the term of this patent is extended or adjusted under 35 U.S.C. 154(b) by 0 days.

(21) Appl. No.: 10/245,226

(22) Filed: Sep. 16, 2002

(65) Prior Publication Data

US 2003/0065044 A1 Apr. 3, 2003

(30) Foreign Application Priority Data

Sep. 14, 2001 (JP) ........................................ 2001-280018

(51) Int. Cl.$^7$ .................................................. C08J 9/36
(52) U.S. Cl. ..................... 264/46.4; 156/78; 156/303.1; 521/183; 521/184; 521/185; 521/189
(58) Field of Search .......................... 264/321, 51, 46.4; 521/183, 184, 185, 189; 156/78, 303.1

(56) References Cited

U.S. PATENT DOCUMENTS 6,576,683 B2 * 6/2003 Yamaguchi et al.

* cited by examiner

*Primary Examiner*—Morton Foelak
(74) *Attorney, Agent, or Firm*—Reed Smith LLP

(57) ABSTRACT

A flexible polyimide foam having an apparent density of 13.5 to 900 kg/m$^3$ and a glass transition temperature of 300° C. or higher can be prepared by mixing an aromatic tetracarboxylic acid comprising 2,3,3',4'-biphenyltetracarboxylic dianhydride a portion of which is converted into its mono- or di-lower primary alcohol ester with an aromatic polyamine containing diaminodisiloxane in an amount of 0.1 to 10 mol. %, based on the amount of total amine compounds, to give a solid of polyimide precursor; heating the solid of polyimide precursor to a temperature of 300° C. to 500° C. to produce a polyimide foam; and compressing the polyimide foam.

9 Claims, No Drawings

AROMATIC POLYIMIDE FOAM

FIELD OF THE INVENTION

This invention relates to a heat resistant flexible aromatic polyimide foam.

BACKGROUND OF THE INVENTION

Foamed products such as polystyrene foam and polyolefin foam are well known. These foamed products are rigid and have low heat resistance.

Polyurethane foam is also well known as a flexible foam but also has low heat resistance.

U.S. Pat. No. 4,241,193 discloses dense, rigid polyimide foam material which is derived from mixtures of aromatic diamines and partial esters of a benzophenonetetracarboxylic acid.

European Patent Specification (EP) 0 437 821 B1 describes a method for producing polyimide products from a combination of an alkyl ester of a tetracarboxylic acid with at least one aromatic and/or heterocyclic aromatic primary diamine.

A polyimide foam product (trade name: SOLIMIDE) is commercially available from INSPEC Corp. This polyimide foam has a glass transition temperature of approx. 250° C.

A copending U.S. patent application Ser. No. 09/895,513 describes a flexible heat resistant polyimide foam having an apparent density of 70 kg/m$^3$ or less and a glass transition temperature of 300° C. or higher.

SUMMARY OF THE INVENTION

In the study for improving the flexible heat resistant polyimide foam of the copending U.S. application from the viewpoint of industrial applicability, the present inventors have noted that it is not easy to precisely adust or control the apparent density or foaming ratio of the flexible polyimide foam.

It is an object of the invention to provide a flexible polyimide foam having a high heat resistance and an precisely ajusted apparent density or foaming ratio.

The invention resides in a flexible aromatic polyimide foam having an apparent density of 13.5 to 900 kg/m$^3$ and a glass transition temperature (Tg) of 300° C. or higher which is obtained by compressing a polyimide foam having an apparent density of 67.5 kg/m$^3$ or less and the same glass transition temperature (Tg). The flexible aromatic polyimide foam of the invention preferably is in the form of sheet having a thickness of 1 to 50 mm.

The flexible aromatic polyimide foam of the invention can be prepared by a process which comprises the steps of:

mixing an aromatic tetracarboxylic acid comprising 2,3,3',4'-biphenyltetracarboxylic dianhydride a portion of which is converted into a mono- or di-lower primary alcohol ester thereof with an aromatic polyamine containing diaminodisiloxane in an amount of 0.1 to 10 mol. %, based on the amount of total amine compounds, to give a solid of polyimide precursor;

heating the solid of polyimide precursor to a temperature of 300° C. to 500° C. to produce a polyimide foam; and compressing the polyimide foam by means of a uniaxial compression press.

By the compression procedure of the invention, the foamed polyimide article can be easily adjusted to have a desired apparent ratio, foaming ratio, or porosity.

DETAILED DESCRIPTION OF THE INVENTION

The flexible aromatic polyimide foam of the invention has an apparent density of 13.5 to 900 kg/m$^3$ (preferably in the range of 20 to 500 kg/m$^3$) and a glass transition temperature of 300° C. or higher (preferably 350° C. or higher). The apparent density of 900 to 13.5 kg/m$^3$ of the flexible polyimide foam essentially corresponds to an extent of foaming of 1.5 to 100 times.

The flexible aromatic polyimide foam of the invention can be prepared by a process comprising the following three steps.

The first step is directed to produce a solid (generally in the form of powder) of polyimide precursor, and can be performed by mixing an aromatic tetracarboxylic acid comprising 2,3,3',4'-biphenyltetracarboxylic dianhydride (hereinafter referred to a-BPDA) a portion (preferably 25 to 50 mol %) of which is converted into a mono- or di-lower primary alcohol ester thereof with an aromatic polyamine (e.g., p-phenylene diamine, or 4,4'-diamino-diphenyl ether) containing diaminodisiloxane in an amount of 0.1 to 10 mol. %, based on the amount of total amine compounds, to give a solid of polyimide precursor.

In the first step, an amine compound having three or more amino groups, such as an aromatic triamine compound or an aromatic tetramine compound, can be added to the mixture. An esterifying solvent such as a primary lower alcohol (e.g., methanol, ethanol, n-propanol, or n-butanol) can be employed for dissolving the mixture in the solvent. A mixture of methanol and ethanol is preferably employed. In the prepared solution, the content of non-volatile components preferably is in the range of 10 to 50 wt. %. The mixture may further contain an imidizing catalyst such as 1,2-dimethylimidazole, benzimidazole, isoquinoline or a substituted pyridine. The mixture may also contain other additives such as an inorganic filler and an inorganic or organic pigment.

The mixture in the form of a solution is then converted into a powdery solid mixture by heating the solution utilizing a known apparatus such as a spray dryer or an evaporator. The solution is generally heated to a temperature lower than 100° C., preferably 80° C. or lower. The drying procedure can be carried out at atmospheric pressure or at an increased or decreased pressure.

The dried mixture was then subjected to the second step for producing the desired flexible aromatic polyimide foam.

The second step can be performed by molding and heating the powdery solid of polyimide precursor produced in the first step to a temperature of 300° C. to 500° C. The second step can preferably be conducted by two stages: the first stage for foaming the molded polyimide precursor to give a rigid foam and the second stage for annealing the rigid foam to give a flexible foamed product.

The first stage is preferably carried out by heating the powdery solid by means of a microwave generator. Accordingly, in the first stage, the powdery solid (or a dispersion of the powder solid in an appropriate solvent) is placed on a plate or in an vessel. The plate or vessel should be resistant to microwaves.

The heating by means of microwaves can be carried out, for instance, at a power of 2.45 GHz. The power of microwave is appropriately chosen in consideration of the powdery solid to be heated. For instance, the powdery solid is heated under the condition of approx. 100 g/1 kW for starting the foaming at approx. one minute, and then the foaming is complete at within 2 or 3 minutes. The foamed product is rigid and brittle.

The rigid and brittle foam is then annealed to give the desired flexible foam. For this purpose, the rigid foam can be gradually heated starting from approx. 200° C., preferably at a temperature elevation rate of approx. 100° C./10 min., up to a temperature corresponding to the glass transition temperature of the foam or higher (that is, Tg or higher), for a period of 5 to 60 minutes, preferably for approx. 10 minutes.

Thus produced flexible foam can be cut, if desired, to give a product of the desired dimensions, in consideration of the utilization of the flexible foam.

In the preparation of the flexible aromatic polyimide foam of the invention, the 2,3,3',4'-biphenyltetracarboxylic dianhydride (a-BPDA) can be employed in combination with a relatively small amount (less than 50 mol. %) of other aromatic tetracarboxylic anhydrides or their reactive derivatives. Examples of the other aromatic tetracarboxylic anhydrides include 3,3',4,4'-biphenyltetracarboxylic acid dianhydride (hereinafter referred to as s-BPDA), pyromellitic dianhydride (hereinafter referred to as PMDA), 3,3',4,4'-benzophenonetetracarboxylic dianhydride (hereinafter referred to as BTDA), bis(3,4-dicarboxyphenyl) ether dianhydride, 2,3,6,7-naphthalenetetracarboxylic dianhydride, 1,2,5,6-naphthalenetetracarboxylic dianhydride, 1,2,4,5-naphthalenetetracarboxylic dianhydride, 1,4,5,8-naphthalenetetracarboxylic dianhydride, 2,2-bis(2,5-dicarboxyphenyl)propane dianhydride 1,1-bis(2,3-dicarboxyphenyl)ethane dianhydride, 1,1-bis(3,4-dicarboxyphenyl)ethane, and 1,3-bis(3,4-dicarboxyphenyl)-1,1,3,3-tetradimethyldisiloxane dianhydride.

The diamine preferably has two nuclei, particularly two benzene rings. A diamine having three or four nuclei may be employed in combination with the diamine to make the preparation of the desired flexible foam easy and smooth.

The diaminodisiloxane can serve as surfactant to give a uniform polyimide foam structure and is preferably employed in an amount of 0.1 to 10 mol. %, more preferably 0.2 to 5 mol. %, based on the amount of total amine compounds.

The third step is performed for the compression of the produced polyimide foam. The compression is preferably performed by means of a uniaxial compression press at a temperature of lower than Tg of the polyimide, and in the range of 300 to 450° C.

The compressed polyimide foam of the invention is favorably employed as in the form of a laminated composite in combination with a metal sheet or ceramic sheet, optionally using an organic or inorganic adhesive. Such laminated composite can be employed as heat-insulating material (e.g., for airplanes and other flying vehicles).

The compressed polyimide foam of the invention can be employed in the form of a jointed foam article. The jointed foam article can be manufactured by one of the below-mentioned processes.

(1) A process comprising the steps of:

mixing an aromatic tetracarboxylic acid comprising 2,3,3',4'-biphenyltetracarboxylic dianhydride a portion of which is converted into a mono- or di-lower primary alcohol ester thereof with an aromatic polyamine containing diaminodisiloxane in an amount of 0.1 to 10 mol. %, based on the amount of total amine compounds, to give a solid of polyimide precursor;

heating the solid of polyimide precursor to a temperature of 300° C. to 500° C. to produce plural polyimide foams in which one polyimide foam has a protrusion having an enlarged top portion and other polyimide foam has an indentation having an enlarged bottom portion;

joining the protrusion of polyimide foam and the indentation of polyimide foam together to give a jointed structure; and compressing the jointed structure.

(2) A process comprising the steps of:

mixing an aromatic tetracarboxylic acid comprising 2,3,3',4'-biphenyltetracarboxylic dianhydride a portion of which is converted into a mono- or di-lower primary alcohol ester thereof with an aromatic polyamine containing diaminodisiloxane in an amount of 0.1 to 10 mol. %, based on the amount of total amine compounds, to give a solid of polyimide precursor;

heating the solid of polyimide precursor to a temperature of 300° C. to 500° C. to produce plural polyimide foams in which one polyimide foam has a protrusion having an enlarged top portion and other polyimide foam has an indentation having an enlarged bottom portion;

compressing each of the plural polyimide foams;

joining the protrusion of compressed polyimide foam and the indentation of compressed polyimide foam together to give a jointed structure.

The present invention is further described by the following examples.

EXAMPLE 1

(Production of Precursor Powder)

In a 500 mL-volume egg-plant type flask were placed 47.1 g (160 mmol) of 2,3,3',4'-biphenyltetracarboxylic dianhydride (a-BPDA), 12.9 g (40 mmol) of 3,3',4,4'-benzophenonetetracarboxylic acid dianhydride (BTDA), 75 g of methanol, and 2.5 g of 1,2-dimethylimidazole (DMZ, catalyst). The mixture in the flask was refluxed under stirring for 60 minutes by placing the flask on an oil bath heated to 100° C., to give a homogeneous reaction mixture.

The reaction mixture was cooled to 30° C., and 21.4 g (198 mmol.) of p-phenylenediamine (PPD), 0.5 g (2 mmol) of 1,3-bis(3-aminopropyl)tetramethyldisiloxane (DADSi), and 77.1 g of methanol were added. The mixture was stirred to give a homogeneous solution.

The solution was concentrated in an evaporator and further heated at 40° C. to dryness in a vacuum dryer. The dry product was pulverized to give a powdery product in a mortar.

(Manufacture of Polyimide Foam)

The powdery product was placed in a compression molding press (S-37.5, available from Jinto Metal Works, Co., Ltd.) using a spacer of 5 mm and subjected to compression molding at room temperature.

The formed mold was placed in an electric oven (RE-4100, available from Sharp Co., Ltd.) and heated by microwaves at 1,100 W for 3 minutes. Thus heated mold was subsequently placed in a heating oven heated to 180° C. for 5 minutes. The temperature of the oven was gradually increased to 360° C. for 36 minutes, and then the temperature was kept at the same temperature for 30 minutes.

The resulting foamed product was flexible and had a foaming extent (ratio) of 150 times, an apparent density of 9.0 kg/m$^3$, and a glass transition temperature (Tg) of 373° C.

(Compression)

The foamed product was sliced to give a sheet of 5.1 mm thick, which was compressed in a uniaxial compression press at 350° C. and 7 MPa for 2 minutes using a spacer of 2 mm thick, to give a compressed product having an apparent density of 27.6 kg/mm$^{2.}$ The foamed product had a satisfactorily high physical strength and was smoothly cut. In comparison with the commercially available polyimide foam (SOLIMIDE), the foamed product of Example 1 had a higher glass transition temperature and a higher extension strength (as much as ten times), and easily recovered its original form.

EXAMPLES 2 TO 6

The procedures of Example 1 were repeated except for varying the degree of compression to give polyimide foam sheets having different thickness. Details are set forth in Table 1.

Comparison Example 1

In a 500 mL-volume egg-plant type-flask were placed 29.4 g (100 mmol.) of a-BPDA, 75 g of methanol, and 1.5 g of DMZ. The mixture in the flask was refluxed under stirring for 60 minutes by placing the flask on an oil bath heated to 90° C., to give a homogeneous reaction mixture.

The reaction mixture was cooled to 30° C., and 10.8 g (110 mmol.) of PPD and 77.1 g of methanol were added. The mixture was stirred to give a homogeneous solution.

The resulting solution was further processed in the same manner as in Example 1, to give a rigid foamed product having a foaming extent (ratio) of 50 times, an apparent density of 26.8 kg/m$^3$, and a glass transition temperature (Tg) of 405° C.

EXAMPLE 7

The procedures for manufacturing polyimide foam described in Example 1 were repeated except for controlling the degree of foaming by placing in the mold a gas-permeable shielding plate, to give a polyimide foam having a foaming extent of 60 times. The produced foam was sliced to give a plate of 12 mm thick, and compressed in the same manner as in Example 1 to give a polyimide foam sheet of 2 mm thick, which had an apparent density of 135 kg/m$^3$ (extent of foaming: 10 times).

[Evaluation of Polyimide Foam]

The produced polyimide foams were subjected to the following measurements:

(1) Glass transition temperature (Tg) DSC (Seiko Electronic Industry Co., Ltd., DSC 220C)

was used. N$_2$ environmental condition, rate of temperature elevation: 20° C./min.

(2) Extent of foaming calculated from true density/apparent density [true density: a polyimide film is prepared from the same composition and measured using a density-gradient tube, apparent density: calculated from weight/apparent volume)
(3) Gurley number: B-type Gurley meter (available Toyo Seiki Co., Ltd.) is used for determining a time (sec) of permeation of a gas of 100 cc at a pressure of 87.9 gf/cm$^2$.
(4) Flexural modulus: measured according to JIS K7171 using Tensilon (UTM-5T, available from Toyo Sokuki Co., Ltd.)

TABLE 1

| | Thickness (mm) of foam Compression | | Tg | Apparent density | Gurley | Flexural |
|---|---|---|---|---|---|---|
| | before | after | (° C.) | (kg/m$^3$) | value | modulus |
| Example 1 | 5.1 | 2 | 373 | 27.6 | 0 | — |
| Example 2 | 7.7 | 2 | 373 | 35.5 | 3 | — |
| Example 3 | 14.1 | 2 | 373 | 69.7 | 44 | — |
| Example 4 | 27.8 | 2 | 373 | 144 | 468 | 190 |
| Example 5 | 42.1 | 2 | 373 | 196 | 1269 | 399 |
| Example 6 | 83.4 | 2 | 373 | 383 | 3637 | 1447 |
| Example 7 | 12 | 2 | 373 | 135 | 440 | — |

Remarks: The apparent density is a value of the compressed foam.

The extents of foaming after the compression are as follows:

Example 1: 49 times, Example 2: 34 times, Example 3: 19 times, Example 4: 9 times, Example 5: 7 times, Example 6: 3.5 times, Example 7: 10 times The compressed foams obtained in Examples 1 to 3 and 7 were so highly flexible that their flexural modulus values were not determined.

EXAMPLE 8

The procedures of Example 1 were repeated to give two compressed polyimide foam sheets having an extent of foaming of approx. 10 times. One of the foam sheets was cut to form two protrusions having an enlarged top portion. Another of the foam sheets was cut to form two indentations having an enlarged bottom portion. The two sheets were joined together using the two protrusions and indentations. The jointed structure was so strong that it cannot be disengaged at an ordinarily applied high tension.

What is claimed is:

1. A process for producing a flexible polyimide foam having an apparent density of 13.5 to 900 kg/m$^3$ and a glass transition temperature of 300° C. or higher, which comprises the steps of:

mixing an aromatic tetracarboxylic acid comprising 2,3,3',4'-biphenyltetracarboxylic dianhydride a portion of which is converted into a mono- or di-lower primary alcohol ester thereof with an aromatic polyamine containing diaminodisiloxane in en amount of 0.1 to 10 mol. %, based on the amount of total amine compounds, to give a solid of polyimide percursor;

heating the solid of polyimide precursor to a temperature of 300° C. to 500° C. to produce a polyimide foam having an apparent density of 67.5 kg/m$^3$ or less; and compressing the polyimide foam by means of a uniaxial compression press at a temperature lower than Tg of the polyimide and in the range of 300°C. to 450° C.

2. The process of claim 1, wherein the polyimide foam before the compression has an apparent density or 6.75 to 67.5 kg/m$^3$.

3. The process of claim 1, wherein the aromatic polyamine comprises comprises 70 to 99.9 mol. % of en aromatic diamine having one or two benzene rings, 0 to 29.9 mol. % of an aromatic triamine or tetramine, and 0.1 to 10 mol. % of diaminosiloxane.

4. The process or claim 1, wherein 25 to 50 mol. % of the aromatic tetracarboxylic acid is converted into a mono- or di-lower primary alcohol ester thereof.

5. The process of claim 1,wherein the step or heating is performed for foaming the solid of polyimide precursor and converting the foam product into a polyimide foam.

6. The process of claim 5, wherein the solid polyimide is foamed by microwave heating.

7. The process of claim 5, wherein the foamed product is heated at a glass transition temperature or higher for conversion into the polyimide foam.

8. A process for producing a jointed flexible polyimide foam article having an apparent density of 13.5 to 900 kg/m$^3$ and a glass transition temperature of 300° C. or higher, which comprises the steps of:

mixing an aromatic tetracarboxylic acid comprising 2,3, 3'4'-biphenyltetracarboxylic dianhydride a portion of which is converted into a mono- or di-lower primary alcohol ester thereof with an aromatic polyamine containing diaminodisiloxane in an amount of 0.1 to 10 mol%. based on the amount of total amine compounds, to give a solid of polyimide precursor;

heating the solid of polyimide precursor to a temperature of 300° C. to 500° C. to produce plural polyimide foams in which one polyimide foam has a protrusion having an enlarged top portion and other polyimide foam has an indentation having enlarged bottom portion;

joining the protrusion of polyimide foam and the indentation of polyimide foam together to give a jointed structure; and compressing the joined structure.

9. A process for producing a jointed flexible polyimide foam article having an apparent density of 13.5 to 900 kg/m$^3$ and a glass transition temperature of 300° C. or higher, which comprises the steps of:

mixing an aromatic tetracarboxylic acid comprising 2.3, 3',4'-biphenyltetracarboxylic dianhydride a portion of which is converted into a mono- or di-lower primary alcohol ester thereof with an aromatic polyamine containing diaminodisiloxane in an amount of 0.1 to 10 mol. %, based on the amount of total amine compounds, to give a solid of polyimide precursor;

heating the solid of polyimide precursor to a temperature of 300° C. to 500° C. to produce plural polyimide foams in which one polyimide foam has a protrusion having an enlarged top portion and other polyimide foam has an indentation having enlarged bottom portion;

compressing each of the plural polyimide foams; and joining the protrusion of compressed polyimide foam and the indentation of compressed polyimide foam together to give a jointed structure.

* * * * *